US008924306B2

(12) United States Patent
Borghetti et al.

(10) Patent No.: US 8,924,306 B2
(45) Date of Patent: Dec. 30, 2014

(54) REMOTE COMPUTER REBOOTING TOOL

(75) Inventors: Stefano Borghetti, Rome (IT);
Gianluca Della Corte, Rome (IT);
Leonida Gianfagna, Naples (IT);
Antonio Sgro', Girifalco (IT)

(73) Assignee: International Business Machines Corporation, Armonk, NY (US)

( * ) Notice: Subject to any disclaimer, the term of this patent is extended or adjusted under 35 U.S.C. 154(b) by 1209 days.

(21) Appl. No.: 12/409,735

(22) Filed: Mar. 24, 2009

(65) Prior Publication Data
US 2009/0210948 A1 Aug. 20, 2009

(51) Int. Cl.
*G06F 21/00* (2013.01)
*H04L 9/32* (2006.01)
*G06F 21/31* (2013.01)
*G06F 9/44* (2006.01)
*G06F 21/30* (2013.01)
*G06F 21/34* (2013.01)

(52) U.S. Cl.
CPC ............ *G06F 9/4416* (2013.01); *H04L 9/3226* (2013.01); *G06F 21/31* (2013.01); *G06F 21/305* (2013.01); *G06F 21/34* (2013.01)
USPC ......................... 705/55; 713/2; 726/9; 726/27

(58) Field of Classification Search
USPC ................. 717/168–178; 726/27; 705/51, 55; 713/2
See application file for complete search history.

(56) References Cited

U.S. PATENT DOCUMENTS

| 4,412,470 | A | * | 11/1983 | Jones ............................... 84/645 |
| 5,276,863 | A | * | 1/1994 | Heider ........................... 709/222 |
| 5,452,454 | A | | 9/1995 | Basu |
| 5,577,210 | A | | 11/1996 | Abdous et al. |
| 5,675,800 | A | * | 10/1997 | Fisher et al. ....................... 713/2 |
| 5,842,011 | A | | 11/1998 | Basu |
| 6,052,779 | A | | 4/2000 | Jackson et al. |
| 6,101,608 | A | | 8/2000 | Schmidt et al. |
| 6,160,873 | A | * | 12/2000 | Truong et al. ............. 379/102.02 |
| 6,189,100 | B1 | | 2/2001 | Barr et al. |
| 6,300,873 | B1 | * | 10/2001 | Kucharczyk et al. ....... 340/568.1 |
| 6,389,539 | B1 | | 5/2002 | Hamilton, II et al. |
| 6,463,530 | B1 | | 10/2002 | Sposato |
| 6,523,072 | B1 | * | 2/2003 | Howarth et al. .................. 710/33 |
| 6,535,976 | B1 | * | 3/2003 | Hoggarth et al. ................. 713/2 |
| 6,539,473 | B1 | | 3/2003 | Hubacher et al. |
| 6,598,159 | B1 | | 7/2003 | McAlister et al. |
| 6,647,497 | B1 | * | 11/2003 | Cromer et al. .................. 726/16 |
| 6,671,808 | B1 | * | 12/2003 | Abbott et al. ...................... 726/4 |

(Continued)

OTHER PUBLICATIONS

Bruce Schneier, "Applied Cryptography", 1996, John Wiley & Sons, Inc., Second Edition.*

Primary Examiner — Steven Kim
(74) Attorney, Agent, or Firm — Nelson and Nelson; Daniel P. Nelson; Alexis V. Nelson

(57) ABSTRACT

A method is presented for rebooting a local data processing entity requiring an access code to boot. The method may include receiving, on a local entity, an access code from a remote entity. The access code may be stored on an auxiliary device coupled to the local entity. The local entity may receive a reboot command from the remote entity and begin rebooting in response thereto. The auxiliary device may provide the access code to the local entity in response to the beginning of the reboot. The access code may then be deleted from the auxiliary device.

20 Claims, 10 Drawing Sheets

(56) References Cited

U.S. PATENT DOCUMENTS

| | | | |
|---|---|---|---|
| 6,675,193 B1 | 1/2004 | Slavin et al. | |
| 6,675,300 B1 * | 1/2004 | Jung et al. | 726/17 |
| 6,711,688 B1 | 3/2004 | Hubacher et al. | |
| 6,731,731 B1 * | 5/2004 | Ueshima | 379/196 |
| 7,024,497 B1 | 4/2006 | Maffezoni | |
| 7,024,695 B1 * | 4/2006 | Kumar et al. | 726/26 |
| 7,136,490 B2 * | 11/2006 | Martinez et al. | 380/284 |
| 7,200,761 B1 * | 4/2007 | Freeman et al. | 713/184 |
| 7,865,351 B2 * | 1/2011 | Mardiks | 703/24 |
| 8,375,220 B2 * | 2/2013 | Prakash et al. | 713/187 |
| 8,504,810 B2 * | 8/2013 | Challener et al. | 713/2 |
| 8,601,571 B2 * | 12/2013 | Kim | 726/20 |
| 2003/0084342 A1 * | 5/2003 | Girard | 713/201 |
| 2003/0200445 A1 * | 10/2003 | Park | 713/185 |
| 2005/0071677 A1 * | 3/2005 | Khanna et al. | 713/201 |
| 2005/0257041 A1 * | 11/2005 | Wallenstein et al. | 713/2 |
| 2008/0028053 A1 * | 1/2008 | Kelley et al. | 709/222 |
| 2008/0082813 A1 * | 4/2008 | Chow et al. | 713/2 |
| 2009/0031013 A1 * | 1/2009 | Kunchipudi et al. | 709/222 |
| 2012/0102555 A1 * | 4/2012 | Kunchipudi et al. | 726/6 |

* cited by examiner

REMOTE COMPUTER REBOOTING TOOL

BACKGROUND

Remote control techniques have become widespread in recent years, due in part to the availability of very large bandwidths in modern telecommunication networks. Generally speaking, a remote control application executed on a remotely-located computer may manage a local computer over a corresponding communication channel. Particularly, data and commands may be input to the local computer through the remote computer. At the same time, information output by the local computer may be replicated on the remote computer. In this manner, the local computer may be substantially completely controlled by the remote computer. Indeed, an operator of the remote computer may work on the local computer as if sitting in front of it.

Remote control techniques may be used to perform maintenance operations on various local computers from a single remote computer. Often, the remote computer may be situated in a central location, while the local computers occupy various peripheral locations.

A typical remote control application involves the installation, removal and upgrade of software products on local computers under the control of the remote computer. Another common application involves remotely diagnosing and fixing problems on the local computers via the remote computer. These techniques may reduce costs associated with maintenance operations, while improving overall quality and responsiveness.

Sometimes, remotely controlling a generic local computer requires its rebooting or restarting. This may occur, for example, where maintenance operations performed on the local computer update its configuration parameters. In this case, it may be necessary to reboot the local computer to make the new configuration parameters take effect. The remote computer may thus send a reboot command to the local computer to shut down and then boot the local computer again. Rebooting in this manner may cause the local computer to access a simple startup routine that initializes the various components of the local computer and then loads its operating system.

Techniques for booting a generic computer over a network have been proposed. In certain cases the startup routine may search the network for a boot server storing the information required to complete booting. This information may then be downloaded onto the computer by means of a simple protocol. For example, the computer may download the operating system, or may download a basic module adapted to download the operating system.

In any case, the local computer may be password-protected to ensure that access to the local computer is granted to authorized persons only. This password must generally be entered manually on the local computer to enable completion of the booting procedure.

SUMMARY

Embodiments of the invention have been developed to remotely reboot a local computer requiring an access code or password to boot.

In one embodiment, a method is presented for rebooting a local data processing entity requiring an access code to boot. The method may include receiving, on a local entity, an access code from a remote entity. The access code may be stored on an auxiliary device coupled to the local entity. The local entity may receive a reboot command from the remote entity and begin rebooting in response thereto. The auxiliary device may provide the access code to the local entity in response to the beginning of the reboot. The access code may then be deleted from the auxiliary device.

A corresponding computer program product and apparatus are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which.

DETAILED DESCRIPTION OF THE INVENTION

Figure 1:
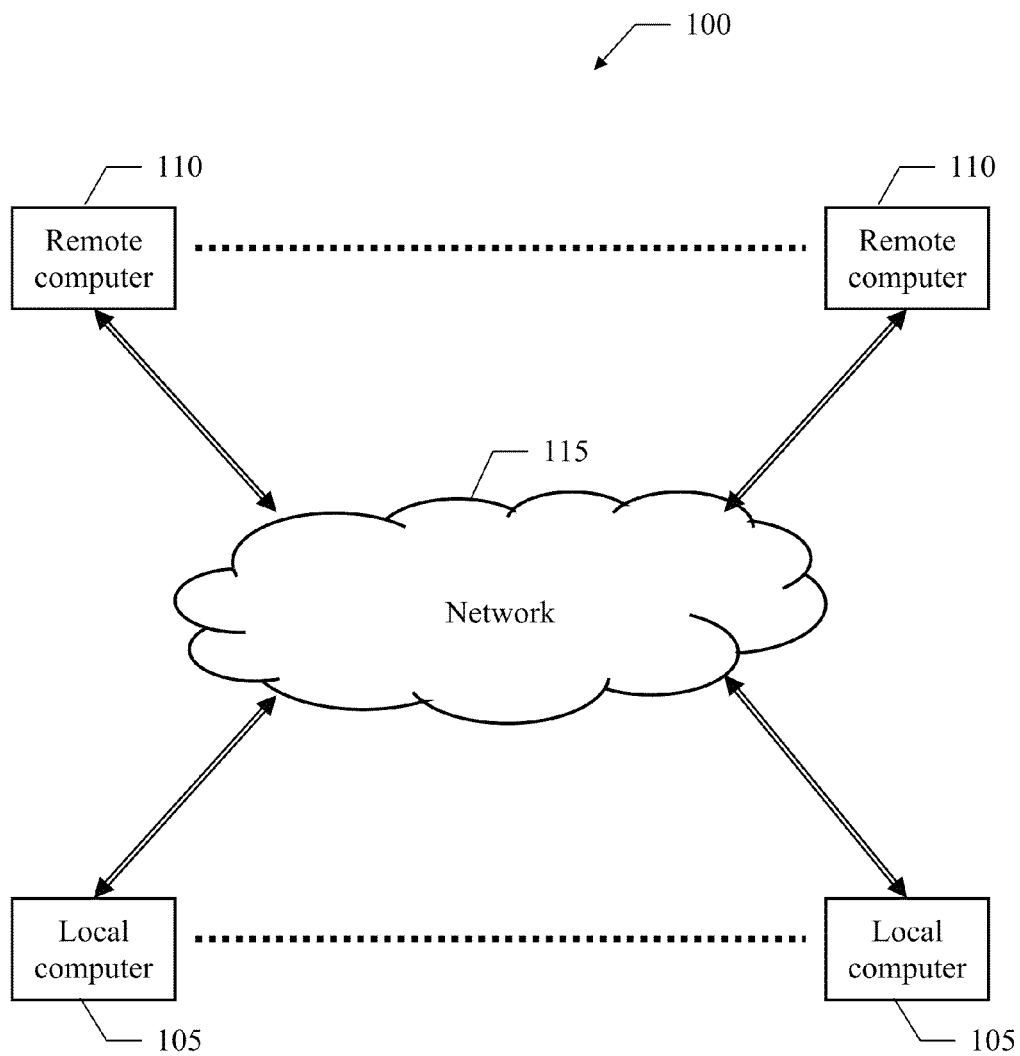
FIG. 1 is a schematic representation of a remote control system.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, a remote control system 100 in accordance with embodiments of the invention may include one or more local computers 105. The local computers 105 may be managed by one or more remote computers 110. In some embodiments, the local computers 105 may be substantially completely under the control of the remote computers 110. The local computers 105 and the remote computers 110 may communicate over a network 115, for example, a LAN.

Particularly, a remote computer 110 may reboot a local computer 105. For this purpose, in one embodiment as shown in FIGS. 2A-2E and as described in more detail below, an auxiliary device 205 may be coupled to the local computer 105 to allow rebooting even when the local computer 105 is protected by a hardware-type password.

Figure 2A:
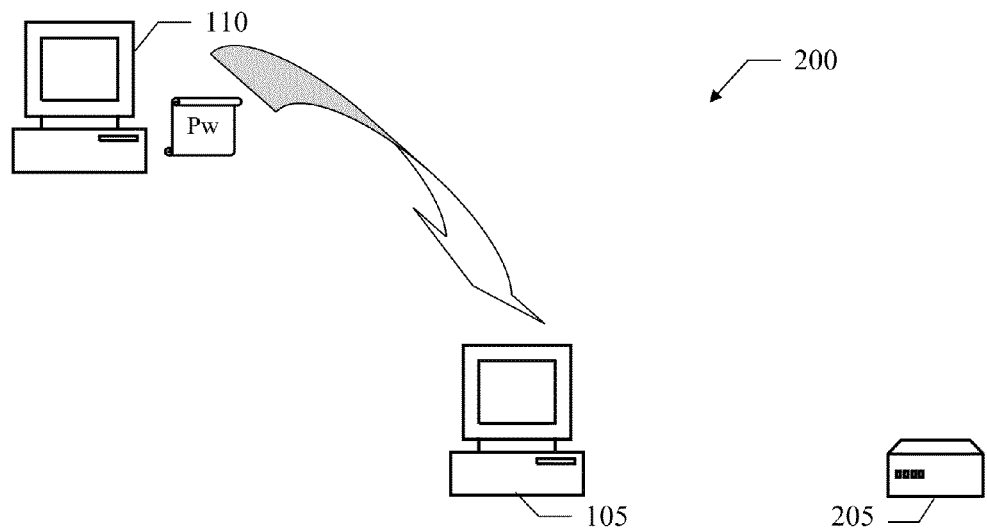
FIGS. 2A-2E depict one embodiment of the invention.

Referring now to FIG. 2A, in some embodiments, the remote computer 110 may first transmit the password to the local computer 105. The remote computer 110 may utilize a communication channel established with the local computer 105 to implement its remote control.

Figure 2B:
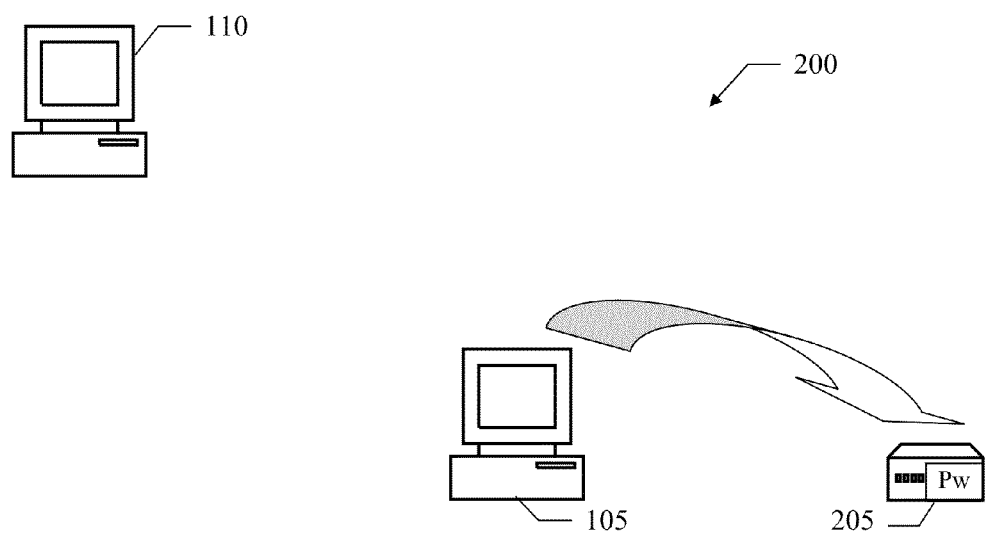

As shown in FIG. 2B, the local computer 105 may forward the password to the auxiliary device 205. The password may then be stored in the auxiliary device 205 in an encrypted form.

Figure 2C:
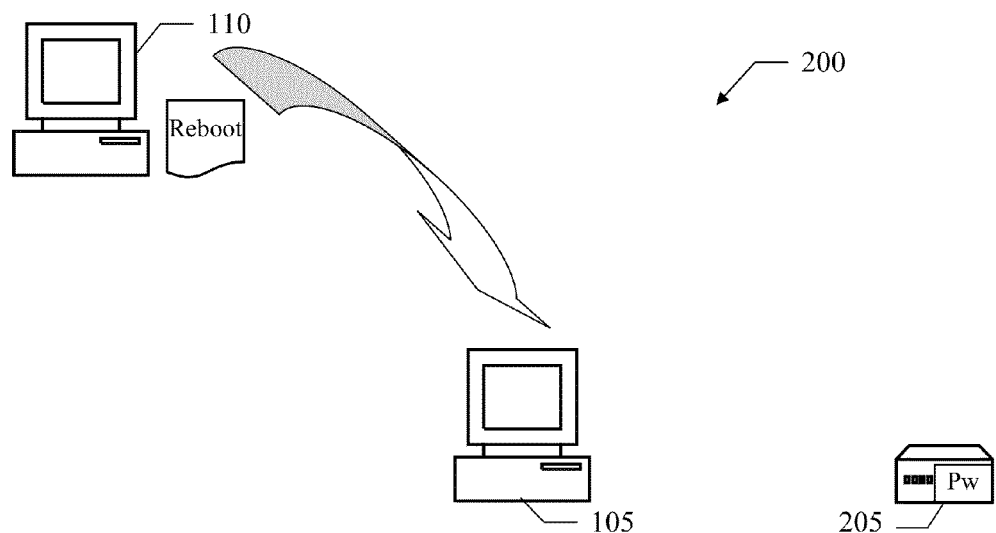

Continuing to FIG. 2C, the remote computer 110 may then transmit a reboot command to the local computer 105. In some embodiments, this command may be transmitted through the same communication channel established between the local computer 105 and the remote computer 110 for purposes of remote control. In response, the local computer 105 may shut down, and then boot again by accessing a startup routine that initializes its components.

Figure 2D:
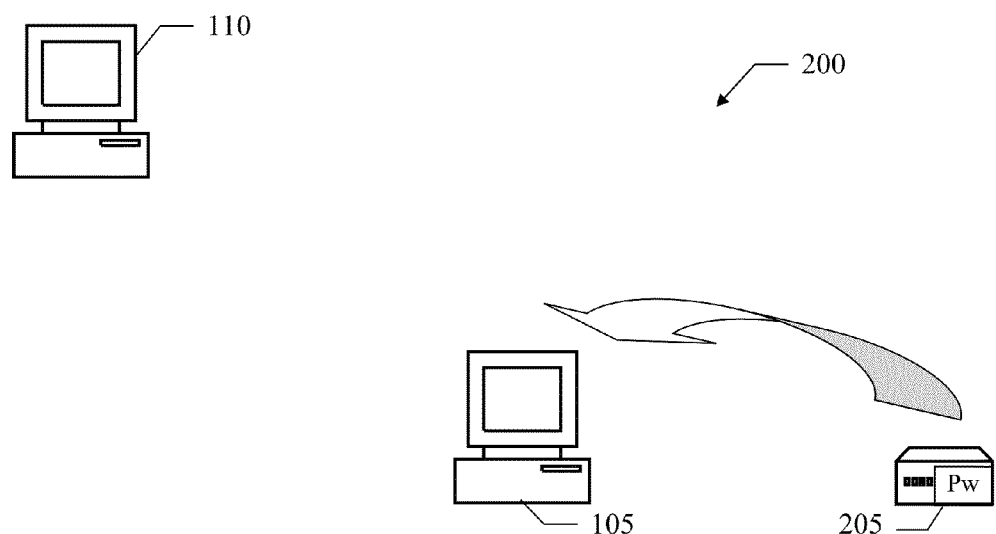

In this phase, as shown in FIG. 2D, the local computer 105 may require entry of a corresponding password to authorize access thereto. The auxiliary device 205 may retrieve the stored password and, in some embodiments, decrypt it. The auxiliary device 205 may then provide the password to the local computer 105 to effectively enter the password as required.

Figure 2E:
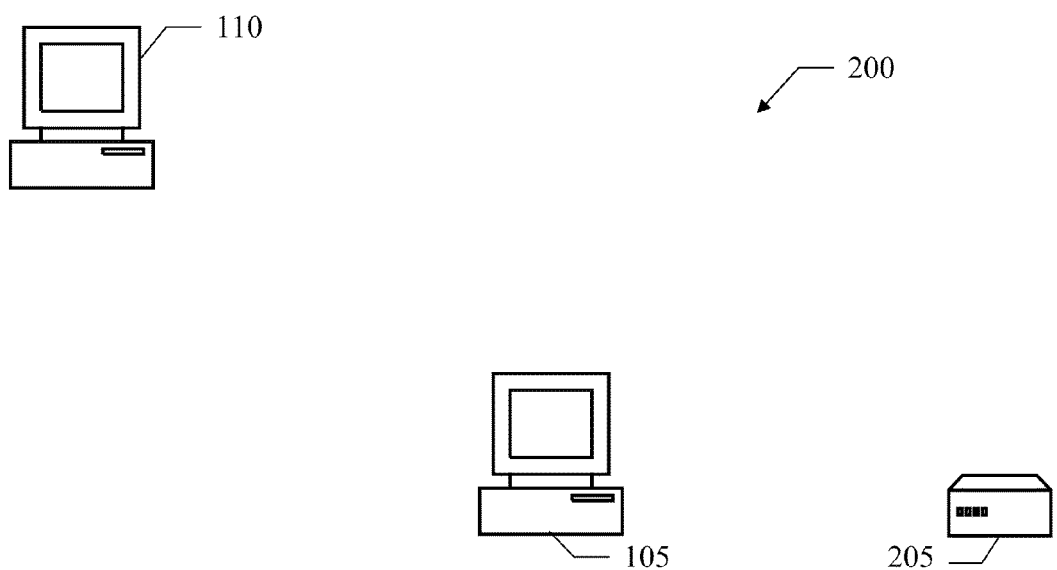

Referring now to FIG. 2E, the booting of the local computer 105 may be completed by loading its operating system via the remote computer 110. The remote computer 110 may again take control of the local computer 105 by establishing a new communication channel, and the password may be deleted from the auxiliary device 205.

In this manner, the local computer 105 may be rebooted even when it is protected by a password. Further, embodiments of the invention may maintain proper security of the local computer 105, since the password may be stored only temporarily on the auxiliary device 205. Advantageously, embodiments of the invention may not require substantial changes to the startup routine of the local computer 105, and may therefore be generally applicable, and simply and inexpensively implemented, in various types of local computers 105.

Figure 3:
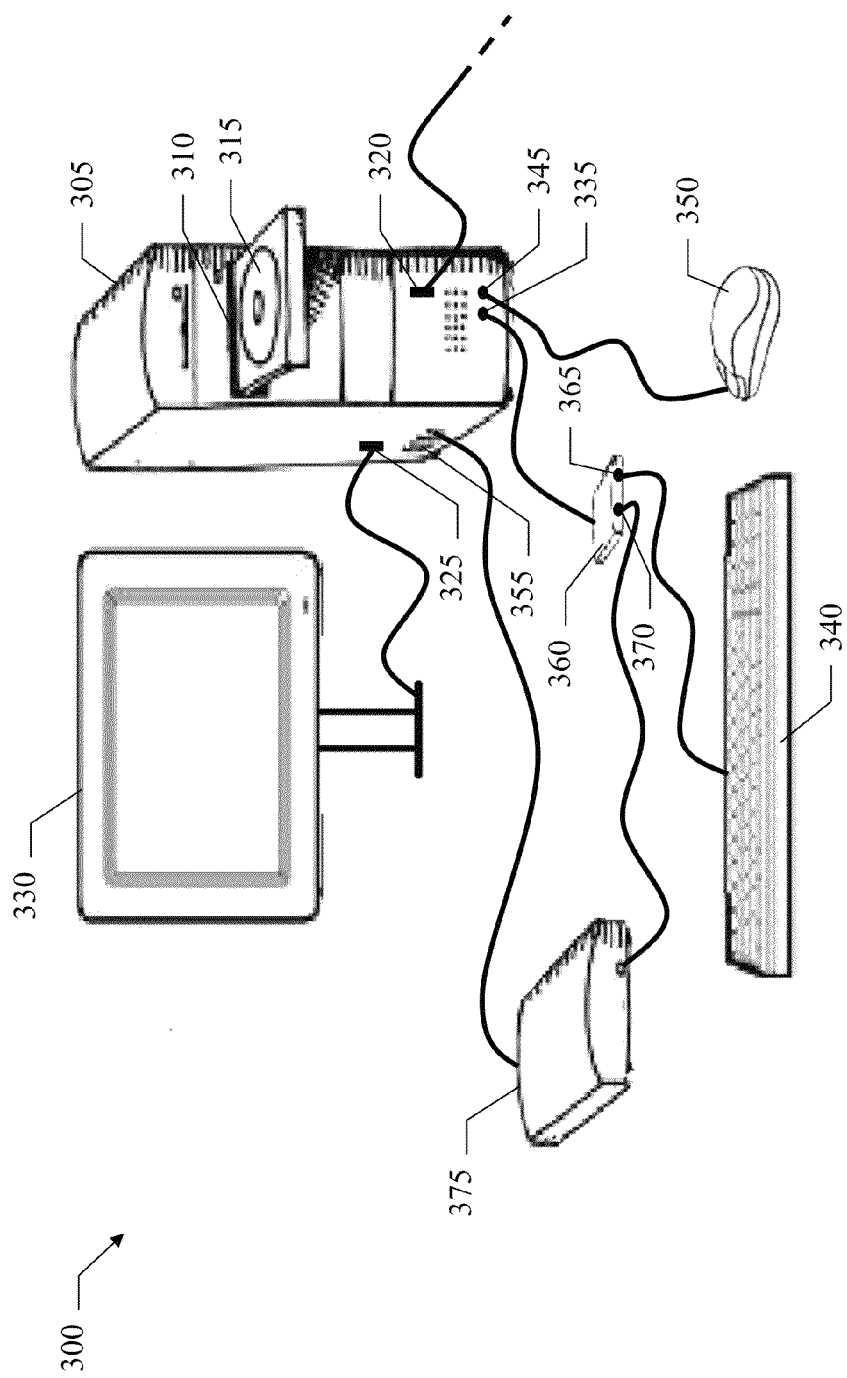
FIG. 3 depicts an alternative embodiment of the invention.

FIG. 3 illustrates a system 300 including a local computer 305 and an associated auxiliary device 375 in accordance with certain embodiments of the invention. Specifically, the local computer 305 of the system 300 may include a central unit 305 to house the electronic circuits controlling its operation. These electronic circuits may include a microprocessor, a working memory, drives for input/output units, a network adapter, and the like. The central unit 305 may also embed a hard-disk and a drive 310 for reading CD-ROMs and/or DVD-ROMs 315.

The central unit 305 may be provided with a series of I/O ports. Particularly, a network port 320 (for example, of the RJ45 type) may be used to plug the local computer into the network being used to communicate with the remote computer. A video port 325 may be used to connect a monitor 330 for displaying images on a corresponding screen. A serial port 335 (for example, a purple PS/2 port) may be used to connect a keyboard 340 for entering symbols and commands. Another serial port 345 (for example, a green PS/2 port) may be used to connect a mouse 350 for controlling a pointer on the screen. Further communication ports 355 (for example, USB ports) may be used to connect other peripheral devices to the central unit 305, for example, a printer and a scanner (not shown).

In one embodiment of the invention, the keyboard 340 may be coupled with the central unit 305 through a multiplier device 360. Specifically, the multiplier 360 may be plugged into the serial port 335 instead of the keyboard 340. The multiplier 360 may include two serial ports 365 and 370, which may be connected in parallel. The keyboard 340 may then be plugged into the serial port 365.

An external box 375 implementing the above-described auxiliary device may be plugged into the serial port 370. In this manner, the external box 375 may be connected in parallel with the keyboard 340 so as to receive the same signals from the central unit 305 and be able to independently provide corresponding signals thereto. The external box 375 may also be connected to one of the communication ports 355 for exchanging information with the central unit 305 directly. Particularly, as described in more detail below, the parallel connection of the external box 375 and the keyboard 340 (through the multiplier 360) may allow detecting the booting of the local computer and providing the required password.

A direct connection between the external box 375 and the central unit 305 (through the communication port 355) may enable the local computer 305 to receive the password transmitted by the remote computer, and may enable the remote computer to verify the status of the rebooting. This embodiment may be readily applied to any local computer, by simply adding the multiplier 360 and the external box 375.

Figure 4:
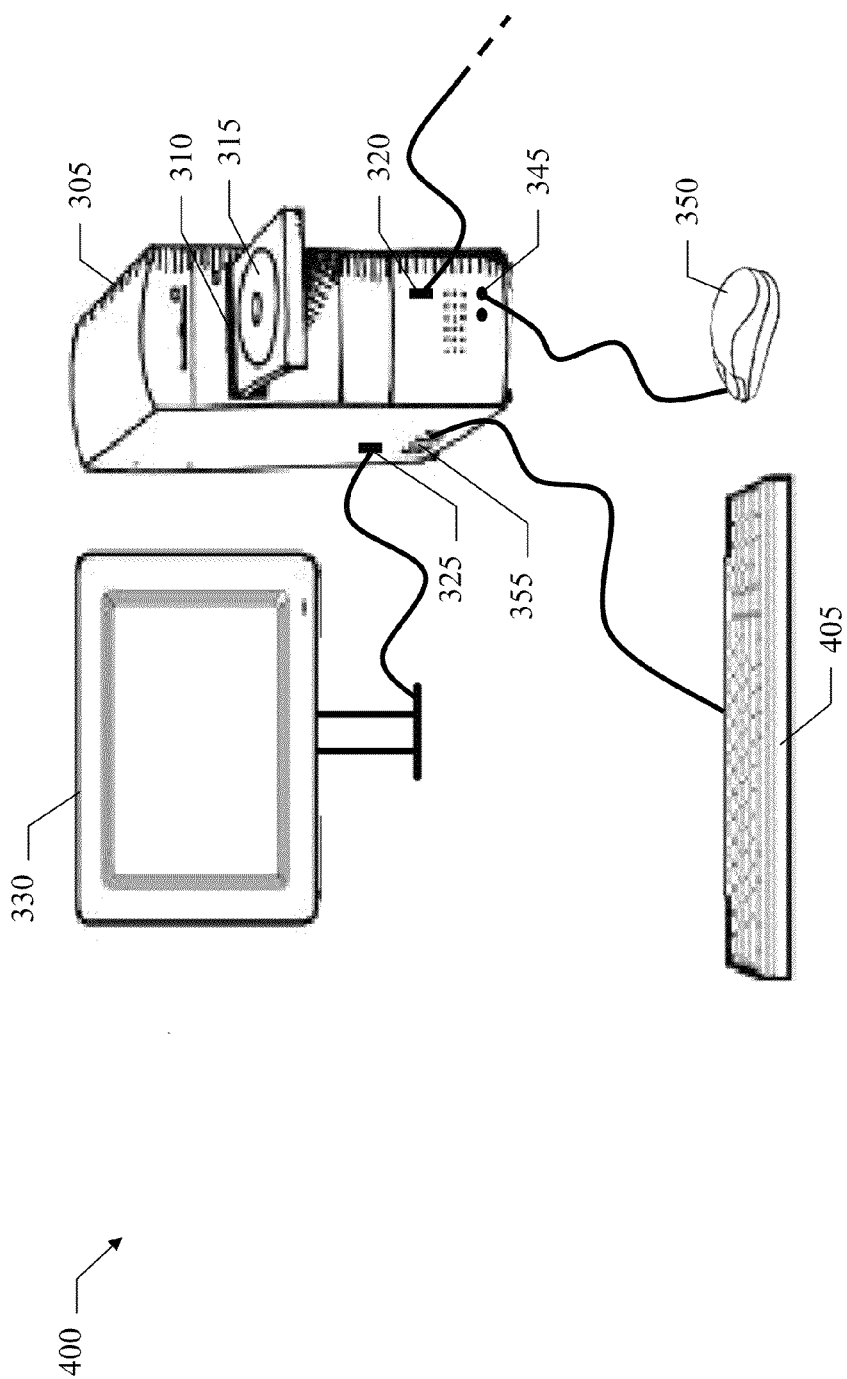
FIG. 4 depicts another embodiment of the invention.

An alternative embodiment of the invention is illustrated in FIG. 4. In this embodiment, a system 400 (including the local computer and the associated auxiliary device, as above) may further include the central unit 305, the drive 310 for CD-ROMs and/or DVD-ROMs 315, the network port 320, the video port 325 (for the monitor 330), the serial port 345 (for the mouse 350), and the communication ports 355.

In some embodiments, a keyboard 405 may be connected to one of the communication ports 355. The keyboard 405 may directly implement the functionality of the above-described auxiliary device, in addition to its own functionality. In one embodiment, the keyboard 405 may include standard components, such as a matrix of keys with corresponding switches, a micro-controller, and indication LEDs. As usual, the micro-controller may sense the keys that are pressed (as indicated by a current flowing through the corresponding switches), and may transmit control codes representative of the pressed keys to the central unit 305. As described in more detail below, however, the micro-controller of the keyboard 405 may also receive the password transmitted by the remote computer, detect the booting of the local computer, provide the required password, and verify the status of the booting.

Figure 5:
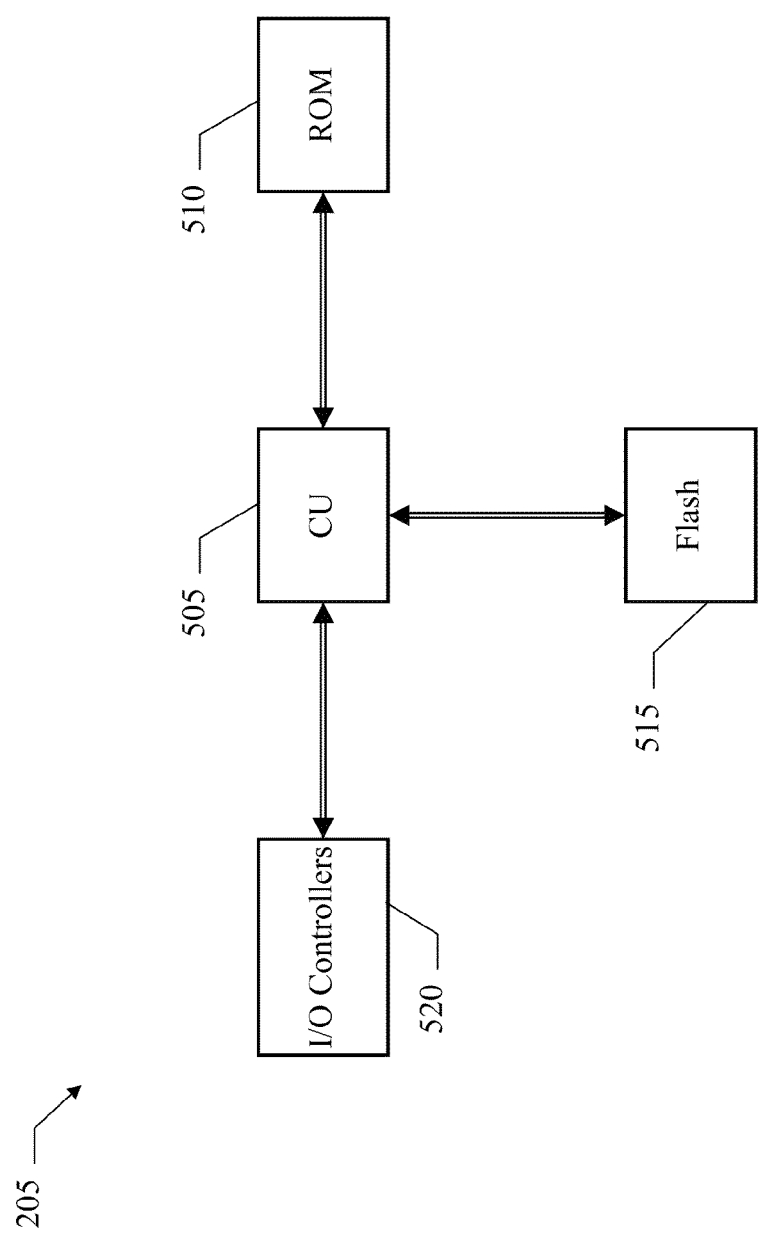
FIG. 5 is a schematic block diagram of an auxiliary device that maybeusedto implement an embodiment of the invention.

A schematic block diagram of an embodiment of the auxiliary device 205 is illustrated in FIG. 5. As previously mentioned, in some embodiments, the auxiliary device 205 may be implemented in the external box 375 or embedded in the keyboard 405.

As shown, the auxiliary device 205 may include a control unit ("CU") 505 that manages its operation. A RAM 510 may be used as a working memory by the control unit 505. A flash memory 515 may store information to be preserved even when a power supply is off. Particularly, the flash memory 515 may include one or more sectors (each one being individually erasable) for storing a control program of the control unit 505, and another sector dedicated to temporarily storing the password of the local computer. The control unit 505 may also interface with one or more I/O controllers 520 for exchanging information with external devices.

Figure 6:
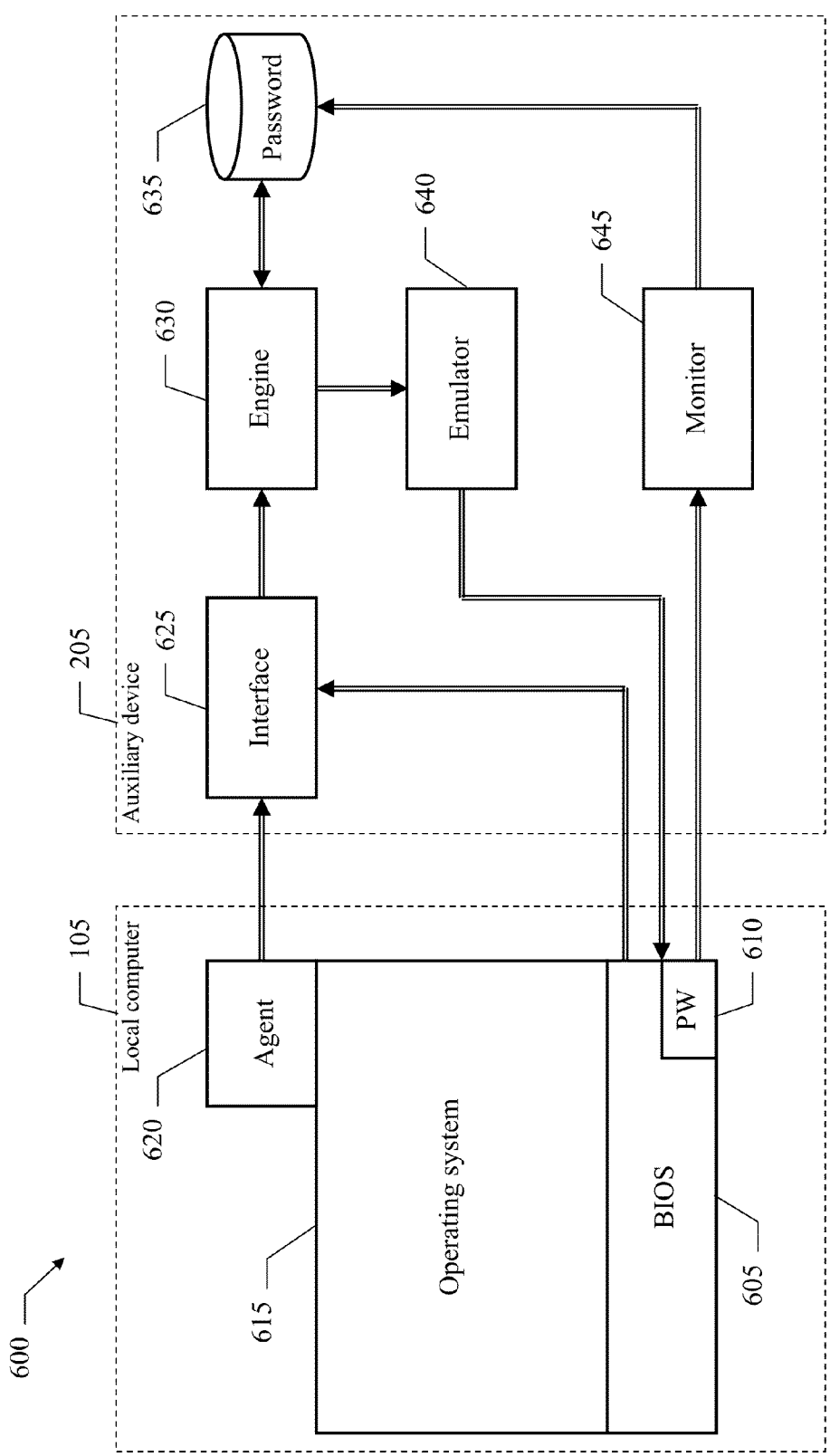
FIG. 6 illustrates main firmware and software components that may be used to practice an embodiment of the invention.

Referring now to FIG. 6, main firmware and software components 600 that may be used to practice an embodiment of the invention are illustrated. Particularly, the local computer 105 may be provided with a Basic Input/Output System ("BIOS") 605 that may implement the startup routine for booting. The BIOS 605 may include a very simple program stored at a predefined location of a nonvolatile memory of the local computer 105 (for example, flash-type memory). This location may be automatically accessed by the microprocessor when the local computer 105 is started.

The BIOS 605 may optionally execute a customization routine by, for example, pressing the F1 key during the first few seconds of execution. The customization routine may enable different configuration parameters 610 of the local computer 105 to be set in a corresponding programmable memory (for example, CMOS-type memory), which may be associated with a battery to preserve its content even when the power supply is off. In this manner, it may be possible to define the password required to boot the local computer 105. It should be noted that, in some embodiments, the above-mentioned configuration parameters 610 (including the password) may be accessed only through the BIOS 605 to prevent their extraction from the CMOS memory.

The BIOS 605 may load, at least in part, an operating system 615 of the local computer 105 (for example, Linux) from the hard-disk into the working memory where it may be executed. The operating system 615 may provide a software platform to implement the fundamental functions of the local computer 105. In one embodiment, for example, the software platform may be utilized to control computer components, run application programs, interact with a user, and the like. In some embodiments, the user may also select different configurations of the operating system, where each one may be defined by a corresponding UserID and user password, for example.

An agent 620 may run on top of the operating system 615. The agent 620 may apply to the local computer 105 remote controls and commands, and may cooperate with a corresponding agent (not shown) running on the remote computer. Particularly, the agent 620 may receive a command transmitted by the remote computer through a communication channel (for example, via a telnet session). The agent 620 may cause the execution of the command on the local computer 105. Further, in some embodiments, the agent 620 may intercept a call to a graphic engine of the local computer 105 (not shown) for displaying information on its monitor. The agent 620 may transmit the call to the remote computer, causing it to replicate such information on a window dedicated to control of the local computer 105.

Moving now to the auxiliary device 205, an interface 625 may receive the password of the local computer 105 (being transmitted by the remote computer) from the agent 620. The interface 625 may transmit the password to an engine 630. The engine 630 may encrypt the password (by means of a hard-coded algorithm, for example), and then store it in an associated sector 635 of its flash memory. This may further secure embodiments of the invention by substantially avoiding risk of untoward password dissemination. Conversely, the engine 630 may retrieve the (encrypted) password from the sector 635, and decrypt it to restore it in clear form. The engine 630 may pass the password to an emulator 640. The emulator 640 may provide the password to the BIOS 605 by emulating its entering with the keyboard. A monitor 645 may interface with the BIOS 605 to verify whether booting of the local computer 105 is proceeding. The monitor 645 may also control deletion of the password from the sector 635.

Figure 7A:
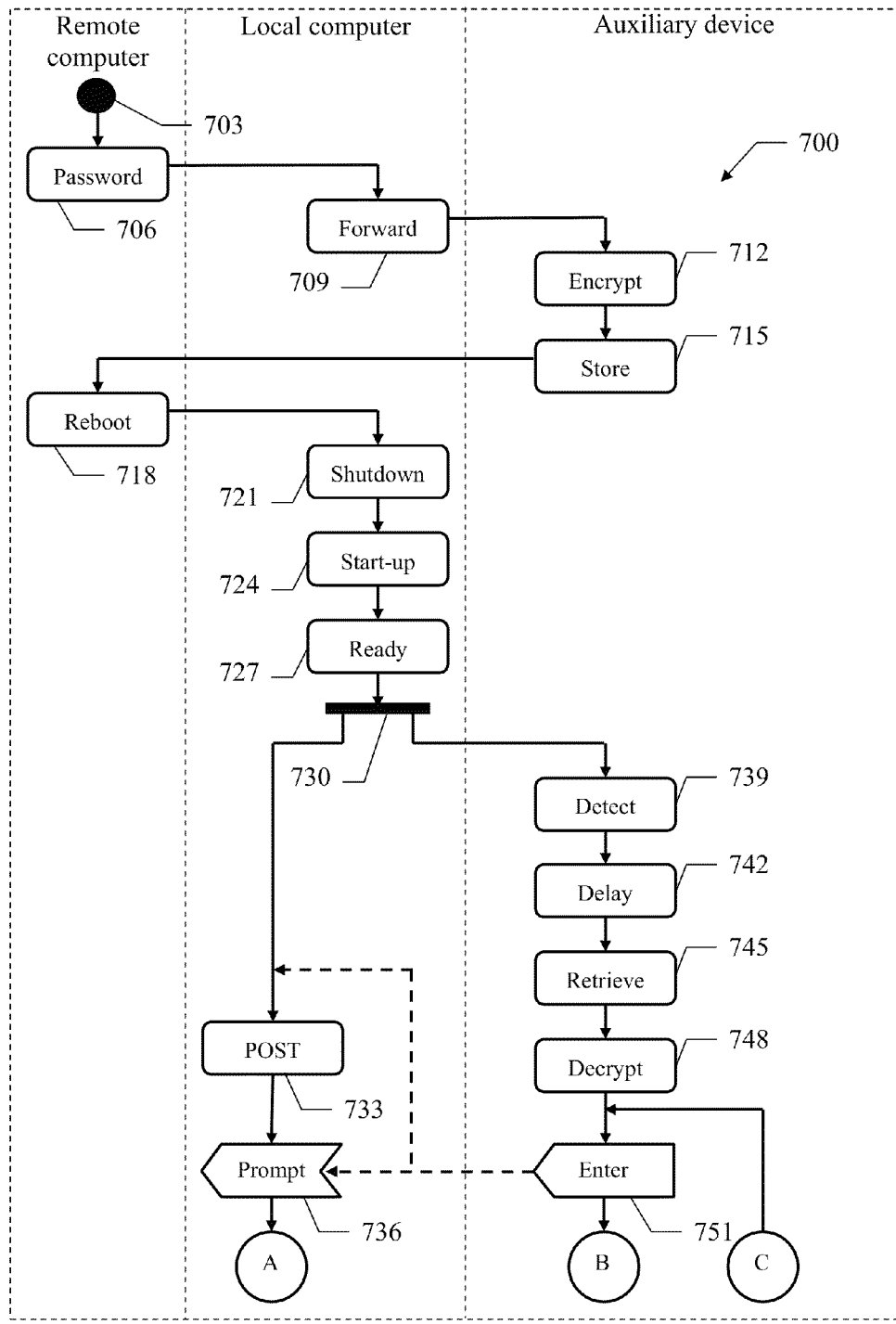
FIGS. 7A-7B are diagrams representing a method in accordance with embodiments of the invention.
Figure 7B:
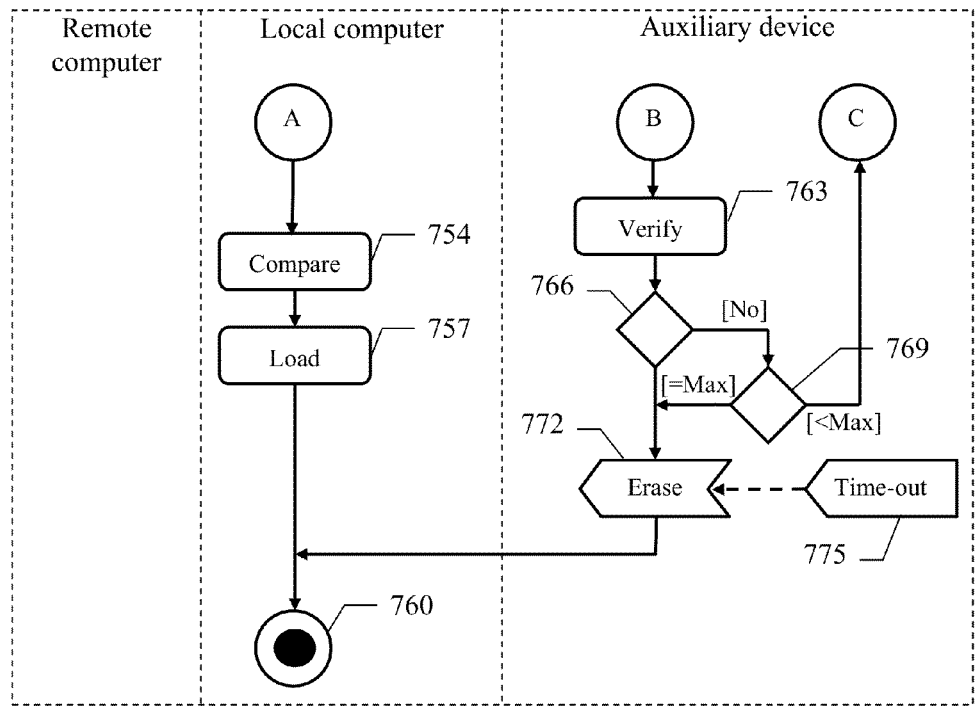

FIGS. 7A and 7B illustrate a method 700 that may be implemented in accordance with the present invention to remotely reboot a local computer.

As shown, a method in accordance with embodiments of the invention may begin 703 in the remote computer column, and then proceed to block 706 when the local computer needs to be rebooted. For this purpose, the remote computer may transmit the password (required for its booting) to the local computer. The local computer may then forward 709 the password to the auxiliary device and the auxiliary device may encrypt 712 the password. The encrypted password may be stored 715 in the flash memory, for example, of the auxiliary device.

Returning to the remote computer column, a reboot command may be transmitted 718 to the local computer. In response, the local computer may shutdown 721. The local computer may then begin booting 724 according to a standard sequence. For this purpose, the microprocessor of the local computer may access a location of its nonvolatile memory identified by a predefined address (such as F000:FFF0) and storing an entry point of the BIOS. This location may contain a jump instruction to transfer execution to the startup routine of the BIOS.

The BIOS may first executes a Power-On Self Test ("POST") procedure to initialize or ready 727 the fundamental components of the local computer. Generally, the components of the local computer may be initialized in a predefined order of increasing complexity, starting from the working memory (where the BIOS typically decompresses itself), the keyboard (to allow the user to invoke the customization routine of the BIOS if desired, and later on to enter the required password), and the other peripheral devices (such as the hard-disk, the monitor, the network card, and so on). For this purpose, the BIOS may verify the correctness of each component, and then configure it for its operation. Once the component has been successfully initialized, the BIOS may send the component a corresponding ready signal.

The flow of activity may fork at synchronization bar 730 upon transmission of the ready signal to the keyboard. In a first branch, the POST may continue 733 with initialization of the other components of the local computer. Once the POST has been completed, the BIOS may prompt 736 the user to enter the password of the local computer.

Substantially simultaneously, the ready signal may be intercepted 739 by the auxiliary device. In response, the auxiliary device may enter 742 a waiting condition. In this phase, the auxiliary device may remain idle for a predefined delay. In some embodiments, the delay (for example, ten to thirty seconds) may be selected based on the time that is typically required by the BIOS to complete the POST and require entering of the password.

The auxiliary device may retrieve 745 the password by reading it from the corresponding sector of its flash memory, for example. The password being read may be decrypted 748 to restore it in clear form. The auxiliary device may then provide 751 the password to the BIOS by emulating its entering with the keyboard.

If the BIOS has not completed the POST so that the other components of the local computer required to enter the password have not been initialized (i.e., the block 736 has not been entered yet), this information may be lost without any effect on the local computer. Conversely, if the BIOS is waiting for the password (at block 736), the flow of activity may descend into block 754.

In this phase, the BIOS may verify the entered password by comparing it with the value stored in its CMOS memory. If the verification is positive, the booting sequence may continue with the BIOS searching for a bootable device. In some embodiments, the BIOS may search for the bootable device according to a predefined list of mass-memory devices. This list may generally start from one or more removable disks (to allow restoring operation of the local computer from a recovery disk), and then continue to the hard disk. A bootable device may be identified by the presence of a bootstrap loader in a predefined (boot) sector.

As soon as the BIOS finds a bootable device, it may load and launch its bootstrap loader. This module may load a main module of the operating system (referred to as a "kernel"), and then transfer control to it. The kernel, in turn, may complete loading the operating system with other modules required for its normal operation. Such other modules may include, for example, drivers for the different peripheral devices. The booting may be complete when the local computer is ready to interact with the user and execute ordinary applications. At this point, usually after about one or two minutes, the method 700 may end 760.

Referring now to the auxiliary device column, the auxiliary device may verify 763 whether booting of the local computer is proceeding correctly. For this purpose, the auxiliary device may send a query 766 to the local computer and wait for a response. The process may branch at block 766 according to the result of the verification. If the booting is not proceeding (i.e., the password has been provided before the relevant components of the local computer have been initialized) a further test may be made 769. If a maximum number of attempts to transmit the password to the local computer (three to five attempts, for example) has not been reached, the same operation 751 may be repeated. In this manner, it may be possible to reboot the local computer even when its POST is longer than expected (because the local computer has undergone a heavy reconfiguration, for example).

Conversely, when the booting is proceeding and the password has been correctly received by the local computer 766 or the maximum number of attempts has been reached 769, the auxiliary device may delete 772 the password from its flash memory (by physically erasing the corresponding sector, for example). The same point may also be reached in a completely asynchronous way, upon expiration 775 of a predefined time-out from the storing of the password on the auxiliary device, for example. In one embodiment, the predefined time-out may be approximately one to two minutes. This may ensure that the password is always removed from the auxiliary device, even when the local computer does not receive the reboot command, for example. In this manner, embodiments of the invention may avoid potential breaches of security. In any case, the method may then end 760.

Naturally, in order to satisfy local and specific requirements, a person skilled in the art may apply to the embodiments described above many logical and/or physical modifications and alterations. More specifically, although the present invention has been described with a certain degree of particularity with reference to certain embodiments, it should be understood that various omissions, substitutions and changes in the form and details as well as other embodiments are possible. Particularly, embodiments of the invention may be practiced without the specific details (such as the numerical examples) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

For example, embodiments of the invention may be implemented with an equivalent method by using similar steps, removing some non-essential steps, or including further optional steps. Moreover, the steps may be performed in a different order, concurrently or in an interleaved way (at least in part).

Although reference has been made in the foregoing to remote control applications, this is not to be interpreted as limiting in any way. Indeed, the same solution may be exploited in any other situation that requires remotely rebooting the local computer. Moreover, it should be readily apparent that the above-described procedures for booting the local computer are merely illustrative. For example, the BIOS (or any equivalent startup routine) may be stored elsewhere and may consist of a main portion (for the fundamental components of the local computer) with optional add-on portions for other components (for example, provided with their own BIOS on corresponding plug-in adapter cards). The booting may also be implemented entirely in hardware, such as in the Initial Program Load ("IPL") procedure.

Similar considerations may apply if booting of the local computer follows a different sequence. For example, it may be possible to have multistage booting involving successively loading programs of increasing complexity, to provide multi-boot options allowing the user to choose different operating systems, and the like.

In some embodiments, the auxiliary device may be coupled to the local computer in another manner, for example, through wireless RF, infrared, or bluetooth connections. Likewise, the password (or substantially equivalent access code) may be transmitted to the local computer in a different way, such as together with the reboot command. Also, the password may be stored in a different memory of the auxiliary device (such as CMOS), may be provided to the local computer through a dedicated connection or by another mechanism known to those in the art, and the like.

In some embodiments, the auxiliary device may begin booting the local computer in response to the initialization of a different component of the local computer such as the monitor, for example.

The values provided for the delay in transmitting the password from the auxiliary device to the local computer are merely illustrative. Moreover, this feature may be optional where, for example, the request for the password is detected by the auxiliary device.

In an alternative embodiment, the password may be stored in the auxiliary device without encryption. This embodiment, and the associated security exposure, may be acceptable in specific situations, and since the password may be deleted from the auxiliary device after a short period of time. In certain embodiments, the password may be deleted substantially immediately after being provided to the local computer.

Similarly, the proceeding of the booting may be verified in an equivalent way, a different maximum number of attempts to provide the password may be allowed, or a single attempt may be performed, with or without verification of its result. In other embodiments, the password may be deleted after a predefined period. In this manner, the number of attempts to provide the password to the local computer may be automatically limited without designating a maximum numerical value.

In some embodiments, the program used to implement embodiments of the invention may be structured in a different way, and additional modules or functions may be provided. Likewise, the memory structures may be of other types, or may be replaced with substantially equivalent entities, not necessarily consisting of physical storage media. In any case, the program may take any form suitable to be used by any data processing system or in connection therewith (for example, within a virtual machine). Particularly, the program may be in the form of external or resident software, firmware, or microcode (either in object code or in source code—for example, to be compiled or interpreted).

In some embodiments, the program may be provided on a computer-usable medium. The medium may include any element suitable to contain, store, communicate, propagate, or transfer the program. For example, the medium may be electronic, magnetic, optical, electromagnetic, infrared, or a semiconductor-type. Examples of such a medium include fixed disks (where the program can be pre-loaded), removable disks, tapes, cards, wires, fibers, wireless connections, networks, broadcast waves, and the like. In any case, embodiments of the present invention may be implemented with a hardware structure (for example, integrated in a chip of semiconductor material), or with a combination of software and hardware.

Embodiments of the invention may also be carried out on a system having a different architecture or including substantially equivalent units. Likewise, the local computer may have another structure or may include similar elements (such as cache memories temporarily storing the programs or parts thereof). Further, it may be possible to replace the local computer with a substantially equivalent data processing entity such as a PDA, a mobile phone, or the like.

The auxiliary device may also be implemented with a different architecture or with substantially equivalent units. For example, the auxiliary device may be connected to the local computer as a stand-alone component, may be embedded in another peripheral device (such as a virtual keyboard), or the like. Of course, a device (or substantially equivalent stand-alone component) implementing the auxiliary device may be put on the market as separate products in order to be used with existing computers.

The invention claimed is:

1. A method for remotely rebooting a local data processing entity requiring an access code to boot, the method comprising:
   receiving, by a local device, an access code from a remote device;
   storing, by the local device, the access code on an auxiliary device coupled to the local device through a keyboard port thereof;
   receiving, by the local device, a reboot command from the remote device;
   initiating, by the local device, a reboot of the local device in response to receiving the reboot command;

detecting, by the auxiliary device, a requirement to input an access code to the local entity, the requirement necessitated by the reboot;

providing, by the auxiliary device, the access code to the local device through the keyboard port in response to detecting the requirement, wherein providing the access code to the local device comprises transmitting keyboard key codes of the access code to the local device; and deleting the access code from the auxiliary device.

2. The method of claim 1, wherein the auxiliary device is incorporated into a keyboard of the local device.

3. The method of claim 1, wherein detecting the requirement comprises intercepting a ready signal provided to a keyboard of the local device.

4. The method of claim 3, wherein providing the access code to the local device comprises providing the access code following a predetermined delay period after intercepting the ready signal.

5. The method of claim 1, wherein storing the access code on the auxiliary device further comprises:
encrypting the access code; and
storing the encrypted access code on the auxiliary device.

6. The method of claim 5, wherein providing the access code to the local device further comprises:
retrieving the access code from the auxiliary device;
decrypting the access code; and
providing the decrypted access code to the local device.

7. The method of claim 1, wherein deleting the access code from the auxiliary device further comprises deleting the access code upon expiration of a predetermined period of time from storing the access code.

8. The method of claim 1, further comprising:
verifying, by the auxiliary device, whether the reboot of the local device is proceeding correctly; and
providing, by the auxiliary device, the access code to the local device again in response to verifying that the reboot is not proceeding correctly.

9. The method of claim 8, wherein deleting the access code from the auxiliary device further comprises deleting the access code in response to verifying that the reboot is proceeding correctly.

10. A computer program product for remotely rebooting a local data processing entity requiring an access code to boot, the computer program product comprising:
a non-transitory computer-readable storage medium storing computer-usable program code that when executed by at least one processor causes the at least one processor to perform the operations of:
receiving, on a local device, an access code from a remote device;
storing the access code on an auxiliary device coupled to the local device through a keyboard port thereof;
receiving, on the local device, a reboot command from the remote device;
initiating a reboot of the local device in response to receiving the reboot command;
detecting, by the auxiliary device, a requirement to input an access code to the local device, the requirement necessitated by the reboot;
providing, by the auxiliary device, the access code to the local device through the keyboard port in response to detecting the requirement, wherein providing the access code to the local device comprises transmitting keyboard key codes to the local entity to input the access code; and
deleting the access code from the auxiliary device.

11. The computer program product of claim 10, wherein the auxiliary device is incorporated into a keyboard of the local device.

12. The computer program product of claim 10, wherein detecting the requirement comprises intercepting a ready signal provided to a keyboard of the local device.

13. The computer program product of claim 12, wherein providing the access code to the local device comprises providing the access code to the local device following a predetermined delay period after intercepting the ready signal.

14. The computer program product of claim 10, wherein storing the access code on the auxiliary device further comprises: encrypting the access code; and storing the encrypted access code on the auxiliary device.

15. The computer program product of claim 14, wherein providing the access code to the local device further comprises:
retrieving the access code from the auxiliary device;
decrypting the access code; and
providing the decrypted access code to the local entity.

16. The computer program product of claim 10, wherein deleting the access code from the auxiliary device further comprises deleting the access code upon expiration of a predetermined period of time from storing the access code.

17. The computer program product of claim 10, wherein the operations further comprise:
verifying, by the auxiliary device, whether the reboot of the local device is proceeding correctly; and
providing, by the auxiliary device, the access code to the local device again in response to verifying that the reboot is not proceeding correctly.

18. The computer program product of claim 17, wherein deleting the access code from the auxiliary device further comprises deleting the access code in response to verifying that the reboot is proceeding correctly.

19. An apparatus for remotely rebooting a local data processing entity requiring an access code to boot, the apparatus comprising:
at least one processor; and
at least one memory device coupled to the at least one processor and storing computer instructions that when executed by the at least one processor cause the at least one processor to perform the operations of:
receiving an access code from a remote device;
storing the access code on an auxiliary device coupled to a local device through a keyboard port thereof;
receiving a reboot command from the remote device;
initiating a reboot of the local device in response to receiving the reboot command;
detecting a requirement to input an access code to the local entity, the requirement necessitated by the reboot;
providing the access code to the local device through the keyboard port in response to detecting the requirement, wherein providing the access code to the local device comprises transmitting keyboard key codes of the access code to the local device; and
deleting the access code from the auxiliary device.

20. The apparatus of claim 19, wherein the operations further comprise encrypting and decrypting the access code.

* * * * *